(12) United States Patent
Tang et al.

(10) Patent No.: US 10,560,897 B2
(45) Date of Patent: Feb. 11, 2020

(54) TRANSMISSION SLOT BLANKING FOR POWER OPTIMIZATION

(71) Applicant: APPLE INC., Cupertino, CA (US)

(72) Inventors: Jia Tang, San Jose, CA (US); Zhu Ji, San Jose, CA (US); Yu-Lin Wang, Fremont, CA (US); Wei Zhang, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/992,826

(22) Filed: May 30, 2018

(65) Prior Publication Data
US 2019/0373555 A1 Dec. 5, 2019

(51) Int. Cl.
*H04W 52/02* (2009.01)
*H04W 72/12* (2009.01)

(52) U.S. Cl.
CPC ... *H04W 52/0258* (2013.01); *H04W 72/1268* (2013.01)

(58) Field of Classification Search
None
See application file for complete search history.

(56) References Cited

U.S. PATENT DOCUMENTS

| | | | |
|---|---|---|---|
| 2009/0154403 A1* | 6/2009 | Niwano | H04W 52/282 370/329 |
| 2011/0188513 A1* | 8/2011 | Christoffersson | H04W 28/06 370/465 |
| 2016/0095138 A1* | 3/2016 | Akkarakaran | H04W 52/0216 370/335 |

\* cited by examiner

*Primary Examiner* — James P Duffy
(74) *Attorney, Agent, or Firm* — Fay Kaplun & Marcin, LLP

(57) ABSTRACT

A method and user equipment for transmission slot blank. The method includes, at the user equipment ("UE"), establishing a voice call, determining whether the voice call currently comprises a silence period, blanking at least two slots of a control frame according to a predetermined pattern, wherein the predetermined pattern includes at least one slot that is not blanked between the at least two slots that are blanked, and transmitting the control frame.

20 Claims, 5 Drawing Sheets

TRANSMISSION SLOT BLANKING FOR POWER OPTIMIZATION

BACKGROUND INFORMATION

A user equipment ("UE") may be configured to establish a connection to at least one of a plurality of different networks or types of networks, as well as to other UEs, to perform a voice call. For example, the UE may communicate with another UE through a network connection (e.g., a voice call over the WCDMA air interface).

A UE may be portable and utilize a limited power supply such as a battery. Thus, a need exists for saving power. Power saving features exist for WCDMA voice. For the downlink, there exist features such as frame early termination ("FET") and voice activity detection (VAD) which opportunistically shut off RF reception when the channel condition is good.

SUMMARY

The present application discloses a method, device and integrated circuit for uplink transmission blanking during a voice call. In a first aspect, a method is disclosed where a user device ("UE") establishes a voice call, determines whether the voice call currently comprises a silence period, blanks at least two slots of a control frame according to a predetermined pattern, wherein the predetermined pattern includes at least one slot that is not blanked between the at least two slots that are blanked, and transmits the control frame.

In a second aspect, a user equipment ("UE") is disclosed including a transceiver, a memory arrangement storing instructions executable by the UE and a processor coupled to the transceiver and the memory arrangement. Execution of the instructions causes the UE to establish a voice call, determine whether at least one channel condition meets a predetermined threshold, when the at least one channel condition meets the predetermined threshold, blank at least one slot of a data frame according to a predetermined pattern, and transmit the data frame.

In a third aspect, an integrated circuit is disclosed. The integrated circuit may include circuitry configured to establish a voice call, circuitry configured to determine whether at least one precondition is met, circuitry configured to determine whether at least one channel condition meets a predetermined threshold, circuitry configured to, when the at least one precondition is met and the at least one channel condition meets the predetermined threshold, blank at least one slot of a data frame according to a predetermined pattern, and circuitry configured to transmit the data frame, wherein the predetermined pattern comprises a plurality of evenly spaced blank slots.

DETAILED DESCRIPTION

Figure 1:
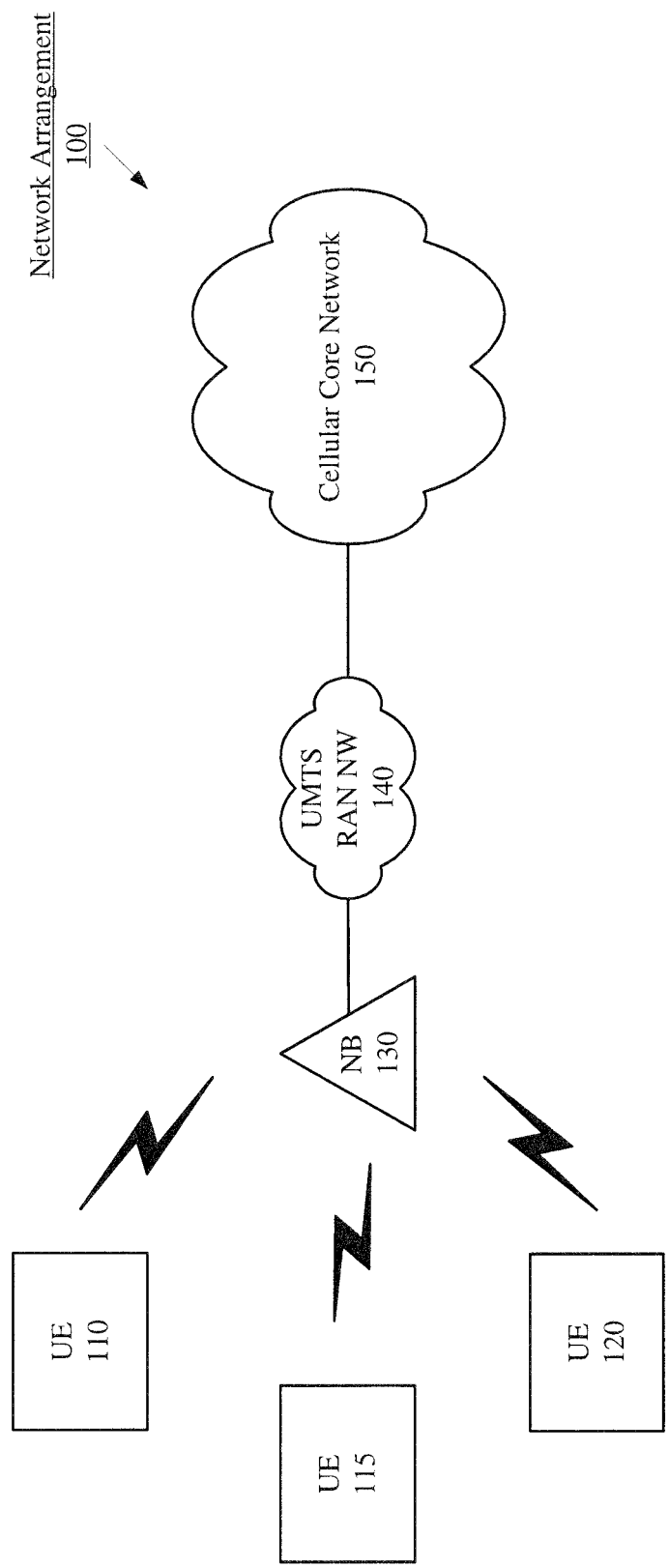
FIG. 1 shows an example network arrangement according to various exemplary embodiments described herein.

The exemplary embodiments may be further understood with reference to the following description and the appended drawings, wherein like elements are provided with the same reference numerals. The exemplary embodiments are related to a device, system and method for power saving during voice calls through insertion of blank frames into uplink channels. In the exemplary embodiments, a mobile device will be described as user equipment ("UE") and the base station will be described as a Node B ("NB") base station, which is generally known as being a base station associated with a UMTS radio access network ("UMTS-RAN"). However, it will be understood by those skilled in the art that UEs and base stations operating in accordance with other network standards may also implement the exemplary embodiments in accordance with the functionalities and principles described herein.

The term "blank," as used herein, refers to a slot in an uplink frame that contains no information, such that a transmitter of the exemplary UE is not transmitting any data or signaling on the blank slot. The term "blanking," as used herein, refers to stopping uplink transmissions for a period of time (e.g., the period of time corresponding to a blanked slot). RF transmission is shut off during blanking to achieve power savings.

FIG. 1 shows an example network arrangement 100 according to various exemplary embodiments described herein. The exemplary network arrangement 100 includes a plurality of UEs 110-120. Those skilled in the art will understand that the UEs 110-120 may be any type of electronic component that is configured to communicate via a network, e.g., mobile phones, tablet computers, desktop computers, smartphones, phablets, embedded devices, wearables, etc. It should be understood that an actual network arrangement may include any number of UEs being used by any number of users and being associated with any number of these users where the user may be associated with one or more UEs. That is, the example of three UEs 110-120 is only provided for illustrative purposes.

The UEs 110-120 may be configured to communicate directly with one or more networks. In this example, the network with which the UEs 110-120 may communicate is a UMTS-RAN 140. However, it should be understood that the UEs 110-120 may also communicate with other types of networks and may also communicate using a wired connection. With regard to the exemplary embodiments, the UEs 110-120 may establish a connection with the UMTS-RAN 140 to, among other functionalities, perform voice calls.

The UMTS-RAN 140 may be a portion of the cellular networks deployed by cellular providers or operators (e.g., Verizon, AT&T, Sprint, T-Mobile, etc.). These networks may include, for example, base client stations (Node Bs, etc.) that are configured to send and receive traffic from UEs that are equipped with an appropriate cellular chip set. Those skilled in the art will understand that the cellular providers may also deploy other types of networks, including further evolutions of the cellular standards, within their cellular networks.

The network arrangement 100 also includes a cellular core network 150. The cellular core network 150 and the UMTS-RAN may be considered a cellular network that is associated with a particular cellular provider. The cellular core network 150 may be considered to be the interconnected set of components that manages the operation and traffic of the cellular network. The interconnected components of the cellular core network 130 may include any number of components such as servers, switches, routers, etc.

The exemplary embodiments relate to the UEs 110-120 connecting to UMTS-RAN 140 via a NB 130. Initially, the UEs 110-120 may establish a connection to the UMTS-RAN 140. Those skilled in the art will understand that any association procedure may be performed for the UEs 110-120 to connect to the UMTS-RAN 140. For example, as discussed above, the UMTS-RAN 140 may be associated with a particular cellular provider where the UEs 110-120 and/or the user thereof has a contract and credential information (e.g., stored on a SIM card). Upon detecting the presence of the UMTS-RAN 140, the UEs 110-120 may transmit the corresponding credential information to associate with the UMTS-RAN 140. More specifically, the UEs 110-120 may associate with a specific access point (e.g., the NB 130 of the UMTS-RAN 140).

Figure 2:
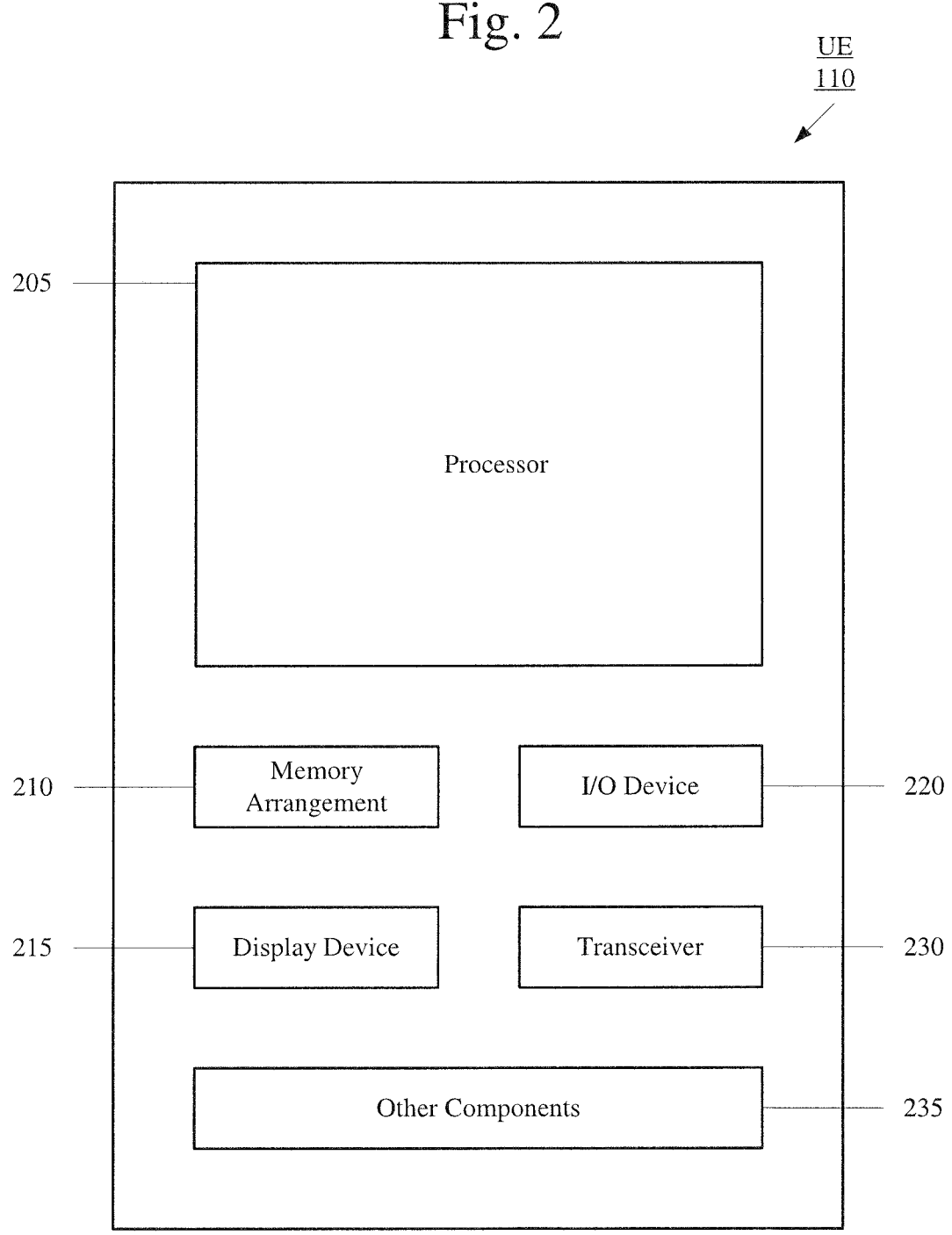
FIG. 2 shows a user equipment for performing uplink transmission blanking according to various exemplary embodiments described herein.

FIG. 2 shows a user equipment 110 for performing uplink transmission blanking according to various exemplary embodiments described herein. The UE 110 may represent any electronic device that is configured to perform wireless functionalities described herein, examples of which are provided above. It should be understood that the below description may also apply to UEs 115 and 120.

The UE 110 may include a processor 205, a memory arrangement 210, a display device 215, an input/output (I/O) device 220, a transceiver 230, and other components 235. The other components 235 may include, for example, an audio input device, an audio output device, a battery, a data acquisition device, ports to electrically connect the UE 110 to other electronic devices, etc. The processor 205 may be configured to execute a plurality of applications of the UE 110.

It should be noted that the described functionalities of the UE 110 each being an application (e.g., a program) executed by the processor 205 is only exemplary. The functionality associated with the applications may also be represented as a separate incorporated component of the UE 110 or may be a modular component coupled to the UE 110, e.g., an integrated circuit with or without firmware. In addition, in some UEs, the functionality described for the processor 205 is split among two processors, a baseband processor and an application processor ("AP"). The exemplary embodiments may be implemented in any of these or other configurations of a UE.

The memory 210 may be a hardware component configured to store data related to operations performed by the UE 110. Specifically, the memory 210 may store data related to various applications. The display device 215 may be a hardware component configured to show data to a user while the I/O device 220 may be a hardware component that enables the user to enter inputs. It should be noted that the display device 215 and the I/O device 220 may be separate components or integrated together such as a touchscreen.

The transceiver 230 may be a hardware component configured to transmit and/or receive data. For example, the transceiver 230 may enable communication with other electronic devices directly or indirectly through one or more networks based upon an operating frequency of the network. The transceiver 230 may operate on a variety of different frequencies or channels (e.g., set of consecutive frequencies). Thus, one or more antennas (not shown) coupled with the transceiver 230 may enable the transceiver 230 to operate on the UMTS frequency band.

Figure 3:
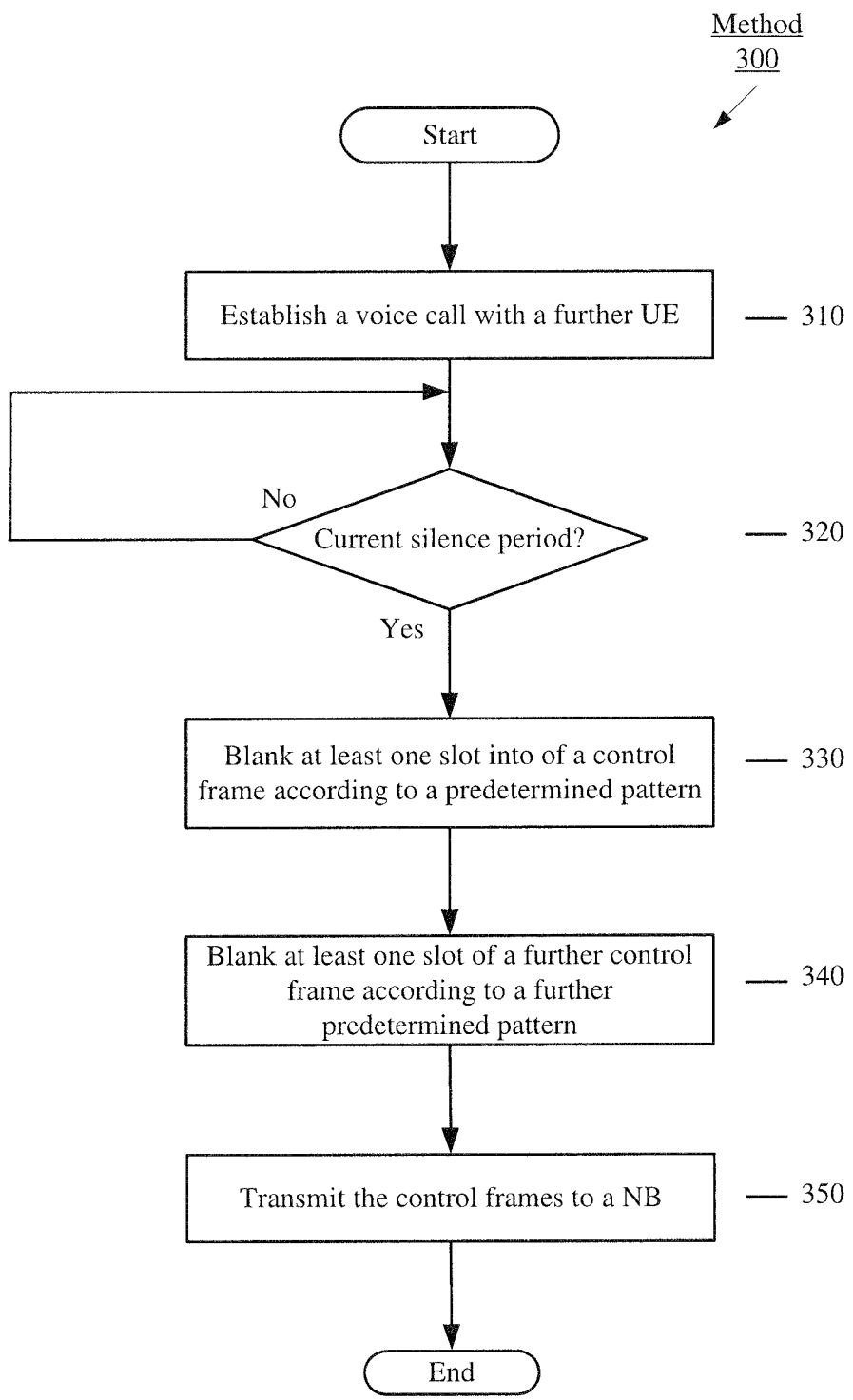
FIG. 3 shows a first exemplary method for uplink control channel transmission blanking according to various exemplary embodiments described herein.

FIG. 3 shows a first exemplary method 300 for uplink control channel transmission blanking according to various exemplary embodiments described herein. The method 300 will be described with reference to the network arrangement 100 of FIG. 1 and to UE 110 of FIG. 2 as it applies to WCDMA voice calls, however the method is applicable to voice calls on any network with a comparable voice data transmission architecture.

It may be considered that the UE 110 operating on the UMTS-RAN 140 sends control information via an uplink control channel (e.g. DPCCH) and data via an uplink data channel (e.g. DPDCH). The control channel is the physical channel on which control information, including transport format combination indicator (TFCI), transmit power control (TPC), and pilot information, is transmitted, and the data channel is the physical channel on which the payload, e.g. voice data, is transmitted. Throughout this description, the information transmitted on the control channel and/or the data channel may be referred to generally as "data" or may also refer to the specific type of data (e.g., control channel information, voice data, etc.). In the example of UMTS-RAN 140, data is transmitted in frames, each frame comprising 15 slots. An exemplary implementation of the method of FIG. 3 and FIG. 4 will be described further below with respect to FIG. 5.

The method of FIG. 3 relates to blanking on the uplink control channel. The method 300 may be performed during a silence period of the voice call. As those skilled in the art will understand, during a voice call there are silence periods in which the UE 110 may continue to transmit control information via the DPCCH to the NB 130, but there is no data being transmitted via the DPDCH for the voice call. The exemplary blanking method 300 for the control channel may be performed during these silence periods.

In 310, the UE 110 may establish a voice call with a further UE, e.g. UE 120. As discussed above, the voice call may be over the WCDMA air interface as utilized by the UMTS-RAN 140. Thus, the UE 110 is communicating with the UMTS-RAN 140 via the NB 130, meaning the communications via uplink channels (e.g. DPCCH and DPDCH) are from the UE 110 to the NB 130. It is noted that in this example, the called UE 120 is shown as being camped on the same NB 130. This is only an example, as the UE 120 may be camped on another NB of the UMTS-RAN 140, may be connected to a different type of wireless network (e.g. LTE network, 5G network, WiFi network), may be a traditional landline, etc. Thus, the called device is irrelevant to the operation of the exemplary embodiments.

In 320, the UE 110 determines whether there is a current silence period for the voice call. If there is no current silence period, the method 300 loops because, as described above, the blanking method 300 is applied during a silence period. If there is a current silence period, the method continues to 330.

In 330, the UE 110 may blank at least one slot of an uplink control frame according to a predetermined pattern. In one exemplary embodiment, the UE 110 blanks three evenly spaced slots per frame, resulting in a spacing of four slots between blank slots. This example will be illustrated in more detail below with reference to FIG. 5.

In 340, the UE 110 may blank at least one slot of a further frame according to a further predetermined pattern. The further frame may be adjacent to the frame that was blanked in 330. In one exemplary embodiment, the UE 110 blanks three evenly spaced slots per frame. However, the further predetermined pattern may be different from the predetermined pattern of 330.

Figure 5:
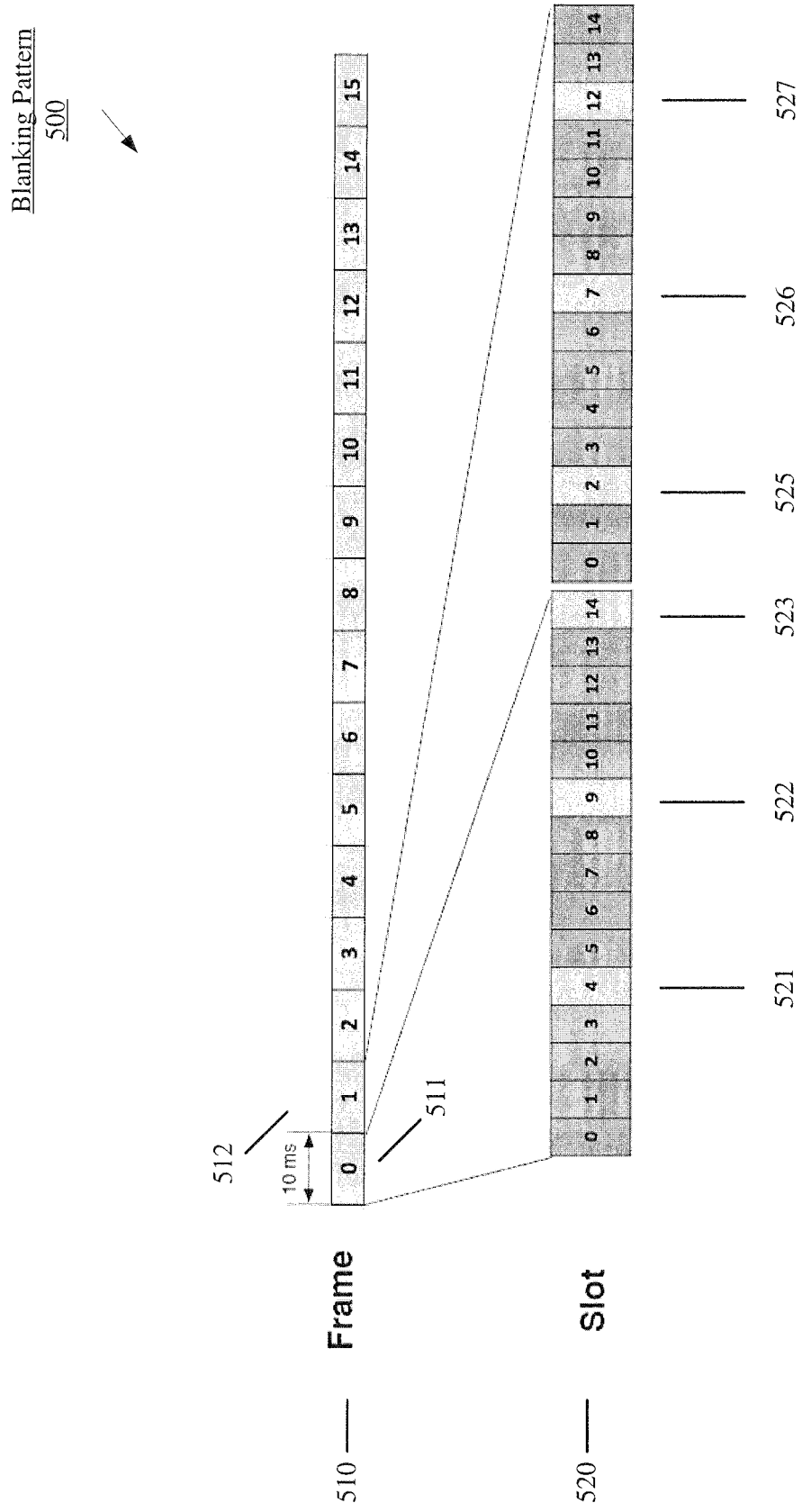
FIG. 5 shows an exemplary uplink channel blanking pattern according to various exemplary embodiments described herein.

FIG. 5 shows an exemplary uplink channel blanking pattern 500 according to various exemplary embodiments described herein. FIG. 5 shows a series of frames 510 and the slots 520 corresponding to frame 0 (511) and frame 1 (512) after the exemplary predetermined blanking patterns of 330 and 340 have been applied. It may be considered that the frames 511 and 512 comprise a single transmission time interval (TTI) for the uplink control channel. Thus, the frame 0 (511) may be considered an even frame and frame 1 (512) may be considered an odd frame. The exemplary pattern 500 shown in the slots 520 may be continued in the same manner for subsequent even and odd frames if these subsequent frames are also transmitted during a silence period.

In this example, the even frame 0 (511) may have been blanked in 330 of method 300. As described above, the predetermined blanking pattern may blank three evenly spaced slots per frame. Thus, in this example, slot 4 (521), slot 9 (522) and slot 14 (523) of frame 0 (511) are blanked. Similarly, the odd frame 1 (512) may have been blanked in 340 of method 300. In this example, there are also three blanked slots, slot 2 (525), slot 7 (526) and slot 12 (527). In both cases, there are three blanked slots and an equal number of slots between the blank slots. However, the slots blanked in the odd frame 1 (512) are offset from the slots blanked in the even frame 0 (511). This offset may be included because the NB 130 may perform cross frame combining for a TTI and, in such a case, having different slots blanked may avoid issues related to Transport Format Combination Indicator (TFCI) decoding. However, it is not a requirement to have such an offset.

Returning to the method 300, in 350, the UE 110 transmits the blanked control frames to the NB 130. In this example, having three blank slots for every frame results in an overall blanking ratio of 20%. The method of FIG. 3 may be performed for every frame transmitted on the uplink control channel during a silence period.

Figure 4:
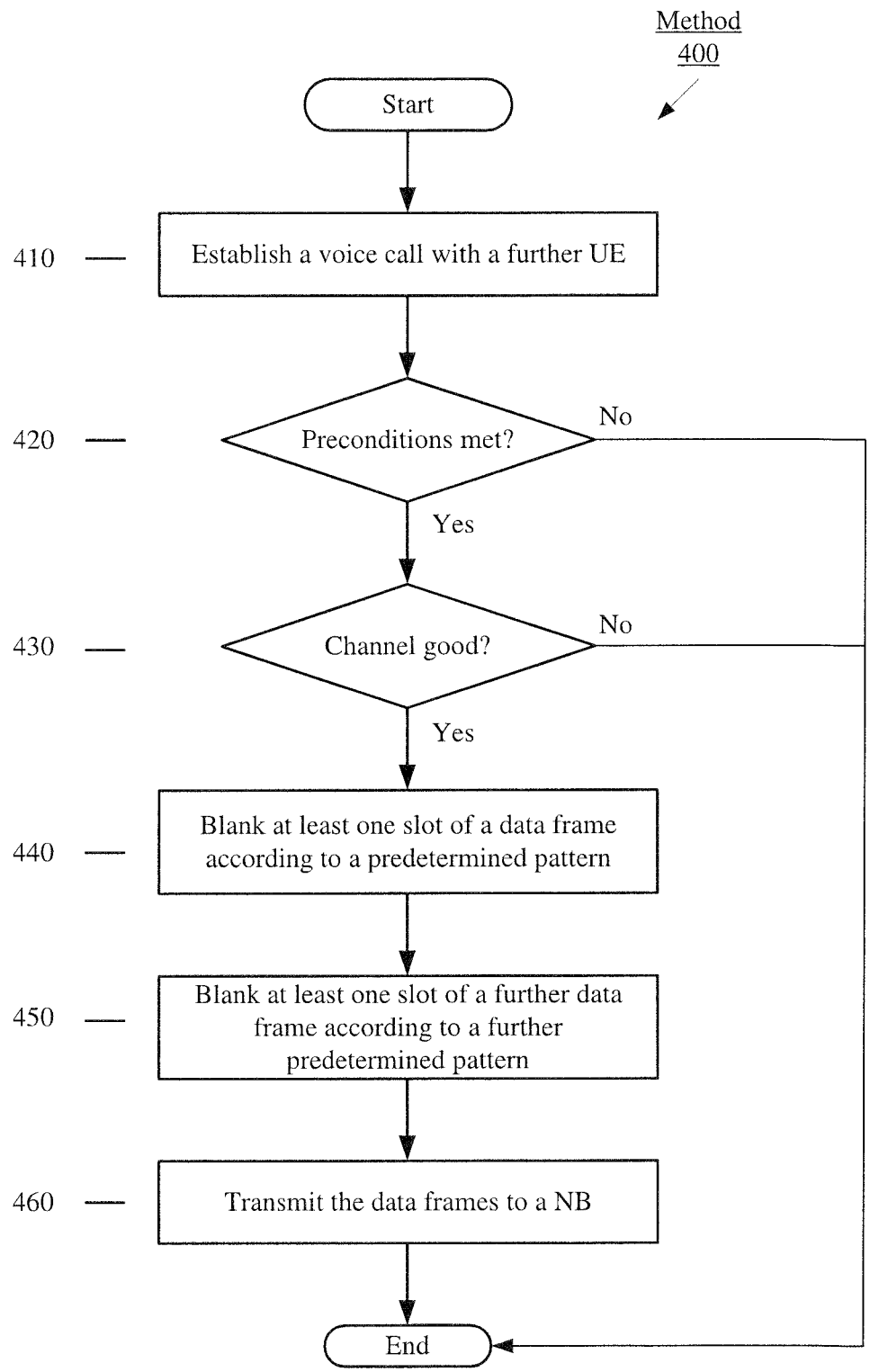
FIG. 4 shows a second exemplary method for uplink data channel transmission blanking according to various exemplary embodiments described herein.

FIG. 4 shows a second exemplary method 400 for uplink data channel transmission blanking according to various exemplary embodiments described herein. The method 400 will be described with reference to the network arrangement 100 of FIG. 1 and to UE 110 of FIG. 2 as it applies to WCDMA voice calls. However, the method is applicable to voice calls on any network with a comparable voice data transmission architecture. The method of FIG. 4 relates to blanking on the uplink data channel (e.g., DPDCH) under certain preconditions. The blanking pattern is substantially similar to that which is described above in the method of FIG. 3 and as shown in FIG. 5. That is, the blanking pattern 500 described above with respect to FIG. 5 and applied to the uplink control channel may also be applied to the uplink data channel.

In 410, the UE 110 may establish a voice call with a further UE, e.g. UE 120. As discussed above, the voice call may be over the WCDMA air interface as utilized by the UMTS-RAN 140.

In 420, the UE determines whether one or more preconditions are met. Four conditions are described herein, but these four conditions are only exemplary. As those skilled in the art will understand, any number of preconditions may be used, and one or more preconditions may be relaxed under certain circumstances. A first exemplary determination may be whether multiple radio access bearers (multi-RAB) are being used. A second exemplary determination may be whether high speed packet access (HSPA) is configured. A third exemplary determination may be whether a signaling radio bearer (SRB) is present. A fourth determination may be whether compressed mode gap is configured. It should be understood that blanking data slots may hinder or prevent the UE 110 from operating in each of the modes. Thus, the preconditions for blanking are used to determine whether the blanking of data frames will degrade certain modes of operation of the UE 110. From these examples, it can be seen that additional preconditions may be used depending on the various modes and functionalities implemented by a particular UE. In this example, if it is determined that any of these exemplary features are currently implemented for the UE 110 then blanking is not used for the uplink data channel and the method ends. If it is determined that none of these features are currently implemented for the UE 130, then the method proceeds to step 430.

In 430, the UE determines whether good channel conditions are present. Three channel metrics are described herein, but these three metrics are only exemplary. As those skilled in the art will understand, any number of metrics may be used for determining whether channel conditions are good enough to implement blanking of the data channel. A single channel metric may determine channel adequacy, or multiple channel metrics may be determined in combination. A first exemplary determination may be whether a signal-to-interference ratio (SIR) estimate exceeds an SIR target by a predetermined margin, e.g. 3 dB. A second exemplary determination may be whether an energy per chip divided by a power density in the band (i.e., Ec/No) is above a certain threshold, e.g. −17 dB. A third exemplary determination may be whether the transmit (Tx) power is below a certain threshold, e.g. 10 dBm. In this example, if these three channel conditions are met, then the channel is deemed to be good, and the method proceeds to step 440. If any of the thresholds are not met, then blanking is not used for the uplink data channel and the method ends.

In 440, the UE 110 may blank at least one slot of an uplink data frame according to a predetermined pattern. This step corresponds to step 320 of FIG. 3. In 450, the UE 110 may blank at least one slot of a further uplink data frame according to a further predetermined pattern. This step corresponds to step 330 of FIG. 3. In 460, the UE 110 transmits the blanked data frames to the further UE 120. This step corresponds to step 340 of FIG. 3. Again, as described above, the result of the blanking method 400 may be the frames/slots as shown in FIG. 5.

Those skilled in art will understand that methods 300 and 400 may be implemented individually or combined and implemented simultaneously at the UE 110. If combined, the blanking method 300 may be used to blank the control channel during silence periods while the blanking method 400 may be used during other times to blank the data channel.

The exemplary embodiments describe a specific blanking pattern, however any pattern may be used in which there is at least one transmitting slot between blanked slots. That is, there should be no adjacent blanked slots. The preferred embodiments utilize equal spacing such as that shown in FIG. 5. Whereas FIG. 5 shows three blank slots with a spacing of four transmitting slots, further patterns may be used, e.g. a pattern of five blank slots with a spacing of two transmitting slots.

The exemplary embodiments are described with reference to signal/data transmission for voice calls. However, the embodiments described herein may be applied to any data transmission utilizing a comparable architecture to that described herein.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made to the present disclosure, without departing from the spirit or the scope of the exemplary embodiments. Thus, it is intended that the present disclosure cover modifications and variations of the exemplary embodiments invention provided they come within the scope of the appended claims and their equivalent.

What is claimed is:

1. A method, comprising:
at a user equipment ("UE"):
establishing a voice call;
determining whether the voice call currently comprises a silence period;
blanking at least two slots of a control frame according to a predetermined pattern, wherein the predetermined pattern includes at least two slots that are not blanked between the at least two slots that are blanked; and
transmitting the control frame.

2. The method of claim 1, wherein the predetermined pattern comprises a plurality of evenly spaced blank slots.

3. The method of claim 2, further comprising:
blanking a second plurality of evenly spaced slots of a further control frame according to a further predetermined pattern, wherein the further control frame is adjacent to the control frame and the further predetermined pattern is different from the predetermined pattern.

4. The method of claim 1, wherein the control frame is transmitted on a DPCCH.

5. The method of claim 1, further comprising:
determining whether at least one precondition is met;
determining whether at least one channel condition meets a predetermined threshold;
when the at least one precondition is met and the at least one channel condition meets the predetermined threshold, blanking at least one slot of a data frame according to the predetermined pattern; and
transmitting the data frame.

6. The method of claim 5, wherein the at least one precondition comprises one of (i) multiple radio access bearers (multi-RAB) being disabled, (ii) high speed packet access (HSPA) being disabled, (iii) no signaling radio bearers (SRB) being present, or (iv) compressed mode gap being disabled.

7. The method of claim 5, wherein the at least one predetermined threshold comprises a threshold related to at least one of (i) a signal-to-interference ratio, (ii) an Ec/No, or (iii) a transmission power.

8. The method of claim 5, wherein the data frame is transmitted on a DPDCH.

9. A user equipment ("UE"), comprising:
a transceiver;
a memory arrangement storing instructions executable by the UE; and
a processor coupled to the transceiver and the memory arrangement, wherein execution of the instructions causes the UE to:
establish a voice call;
determine whether at least one channel condition meets a predetermined threshold;
when the at least one channel condition meets the predetermined threshold, generate a data frame comprising a plurality of blank slots and a plurality of slots including data according to a predetermined pattern; and
transmit the data frame.

10. The UE of claim 9, wherein execution of the instructions further causes the UE to:
determine whether at least one precondition is met.

11. The UE of claim 9, wherein the predetermined pattern comprises a plurality of evenly spaced blank slots.

12. The UE of claim 9, wherein execution of the instructions further causes the UE to:
blank a second plurality of evenly spaced slots of a further data frame according to a further predetermined pattern, wherein the further data frame is adjacent to the data frame and the further predetermined pattern is different from the predetermined pattern.

13. The UE of claim 10, wherein the at least one precondition comprises one of (i) multiple radio access bearers (multi-RAB) being disabled, (ii) high speed packet access (HSPA) being disabled, (iii) no signaling radio bearers (SRB) being present, or (iv) compressed mode gap being disabled.

14. The UE of claim 9, wherein the at least one predetermined threshold comprises a threshold related to at least one of (i) a signal-to-interference ratio, (ii) an Ec/No, or (iii) a transmission power.

15. The UE of claim 9, wherein execution of the instructions further causes the UE to:
determine whether the voice call currently comprises a silence period;
blank at least one slot of a control frame according to a predetermined pattern; and
transmit the control frame.

16. The UE of claim 15, wherein the data frame is transmitted on a DPDCH and wherein the control frame is transmitted on a DPCCH.

17. An integrated circuit, comprising:
circuitry configured to establish a voice call;
circuitry configured to determine whether at least one precondition is met;
circuitry configured to determine whether at least one channel condition meets a predetermined threshold;
circuitry configured to, when the at least one precondition is met and the at least one channel condition meets the predetermined threshold, blank at least one slot of a data frame according to a predetermined pattern; and
circuitry configured to transmit the data frame,
wherein the predetermined pattern comprises a plurality of evenly spaced blank slots separated by at least two slots that are not blanked.

18. The integrated circuit of claim 17, further comprising:
circuitry configured to blank a second plurality of evenly spaced slots of a further data frame according to a further predetermined pattern, wherein the further data frame is adjacent to the data frame and the further predetermined pattern is different from the predetermined pattern.

19. The integrated circuit of claim 17, wherein the at least one precondition comprises at least one of (i) multiple radio access bearers (multi-RAB) being disabled, (ii) high speed packet access (HSPA) being disabled, (iii) no signaling radio bearers (SRB) being present, and (iv) compressed mode gap being disabled; and wherein the at least one predetermined threshold comprises a threshold related to at least one of (i) a signal-to-interference ratio, (ii) an Ec/No, and (iii) a transmission power.

20. The integrated circuit of claim 17, further comprising:

circuitry configured to determine whether the voice call currently comprises a silence period;

circuitry configured to blank at least one slot of a control frame according to a predetermined pattern; and circuitry configured to transmit the control frame.

* * * * *